US008164800B2

(12) United States Patent
Ulrich et al.

(10) Patent No.: US 8,164,800 B2
(45) Date of Patent: Apr. 24, 2012

(54) METHOD AND DEVICE FOR ENGRAVING PRINTING CYLINDERS

(75) Inventors: Michael Walter Ulrich, Kaaks (DE); Jan Herrmann Breiholdt, Altwittenbek (DE)

(73) Assignee: Hell Gravure Systems GmbH & Co. KG, Kiel (DE)

( * ) Notice: Subject to any disclaimer, the term of this patent is extended or adjusted under 35 U.S.C. 154(b) by 790 days.

(21) Appl. No.: 12/264,349

(22) Filed: Nov. 4, 2008

(65) Prior Publication Data

US 2009/0122353 A1 May 14, 2009

(30) Foreign Application Priority Data

Nov. 9, 2007 (DE) ......................... 10 2007 053 909

(51) Int. Cl.
*H04N 1/40* (2006.01)

(52) U.S. Cl. ..................................... 358/3.32; 358/3.29

(58) Field of Classification Search ........ 358/3.29–3.32, 358/296, 300, 1.4–1.5, 1.7, 1.12, 1.18; 101/401, 101/401.1, 492, 483, 211, 32, 34
See application file for complete search history.

(56) References Cited

U.S. PATENT DOCUMENTS

| | | | | |
|---|---|---|---|---|
| 3,351,009 | A * | 11/1967 | Plank | 101/401.1 |
| 4,013,829 | A | 3/1977 | Baar et al. | |
| 4,665,824 | A * | 5/1987 | Greiner et al. | 101/492 |
| 6,502,510 | B1 | 1/2003 | Breiholdt | |

FOREIGN PATENT DOCUMENTS

| | | | |
|---|---|---|---|
| DE | 25 08 734 | | 8/1976 |
| DE | 199 47 397 | A1 | 5/2001 |
| DE | 100 10 904 | A1 | 9/2001 |
| DE | 101 16 672 | A1 | 10/2001 |
| JP | 2001071449 | A | 3/2001 |

* cited by examiner

*Primary Examiner* — Thomas D Lee
*Assistant Examiner* — Stephen M Brinich
(74) *Attorney, Agent, or Firm* — Schiff Hardin LLP

(57) ABSTRACT

In a method or machine for engraving printing cylinders for packaging, pattern, or wallpaper printing and equipped with at least two engraving members, each engraving member engraving elements to be printed into the printing cylinder and, for an areal engraving, executes a feed movement parallel to a longitudinal axis of the printing cylinder. To shorten engraving time, a print image or layout for the printing cylinder is subdivided into at least two circumferential engraving strips, one engraving member being associated with each engraving strip. At least one strip boundary is automatically placed between said engraving strips in at least one white space remaining unengraved between at least some of the elements to be printed.

18 Claims, 5 Drawing Sheets

METHOD AND DEVICE FOR ENGRAVING PRINTING CYLINDERS

BACKGROUND

This present preferred embodiment concerns a method and a device for engraving printing cylinders for packaging printing and similar printing applications in an electronic engraving machine in which an engraving member engraves elements to be printed (in particular made up of cups) into the printing cylinders, and the engraving member for areal engraving executes a feed movement parallel to the longitudinal axis of a printing cylinder. To shorten the engraving time, an engraving member can be associated with a respective circumferential engraving strip when a print image or layout for a respective printing cylinder is sub-divided into at least two of such circumferential engraving strips parallel to one another and next to each other in the axial direction.

An electronic engraving machine for engraving printing cylinders is known from DE-C-25 087 34. An engraving member with an engraving tool controlled by an engraving control signal as a cutting tool moves along a rotating printing cylinder in the axial direction. The engraving element cuts cups into the generated surface of the printing cylinder, which cups are arranged in an engraving grid in the manner of engraving lines. The engraving control signal is obtained by superimposing a periodic raster signal with image signal values which represent the tone values to be engraved. While the raster signal produces an oscillating lifting motion of the engraving tool to engrave the cups arranged in the engraving grid, the image signal values determine the geometric dimensions of the cups corresponding to the tone values to be engraved. According to the preferred embodiment, laser engraving tools could also be considered as engraving members. Instead of rotogravure cylinders with cups, cylindrical flexoprinting forms could also be engraved according to the preferred embodiment.

For magazine printing, for the most part the various print sides of a print job are simultaneously engraved with a respective engraving member on a printing cylinder on axially parallel, band-shaped cylinder regions called engraving lines.

However, for packaging printing and for similar printing applications (for example pattern or wallpaper printing) it is common practice (as is known from DE 199 47 397 A1) to engrave a printing cylinder in an engraving strip with only one engraving member. However, this procedure has the disadvantage that, in the engraving of large (in particular long) printing cylinders, long engraving times result that can amount to multiple hours. In contrast to this, the advantage is that no visible junctions (to which the human eye is very sensitive) arise in the engraved image.

SUMMARY

It is an object to improve a method and a device for engraving printing cylinders for packing printing and similar printing applications such that the times required for engraving the printing cylinders are shortened without visible junctions arising in the engraved image.

In a method or machine for engraving printing cylinders for packaging, pattern, or wallpaper printing and equipped with at least two engraving members, each engraving member engraving elements to be printed into the printing cylinder and, for an areal engraving, executes a feed movement parallel to a longitudinal axis of the printing cylinder. To shorten engraving time, a print image or layout for the printing cylinder is subdivided into at least two circumferential engraving strips, one engraving member being associated with each engraving strip. At least one strip boundary is automatically placed between said engraving strips in at least one white space remaining unengraved between at least some of the elements to be printed.

DESCRIPTION OF THE PREFERRED EMBODIMENT

Figure 1:
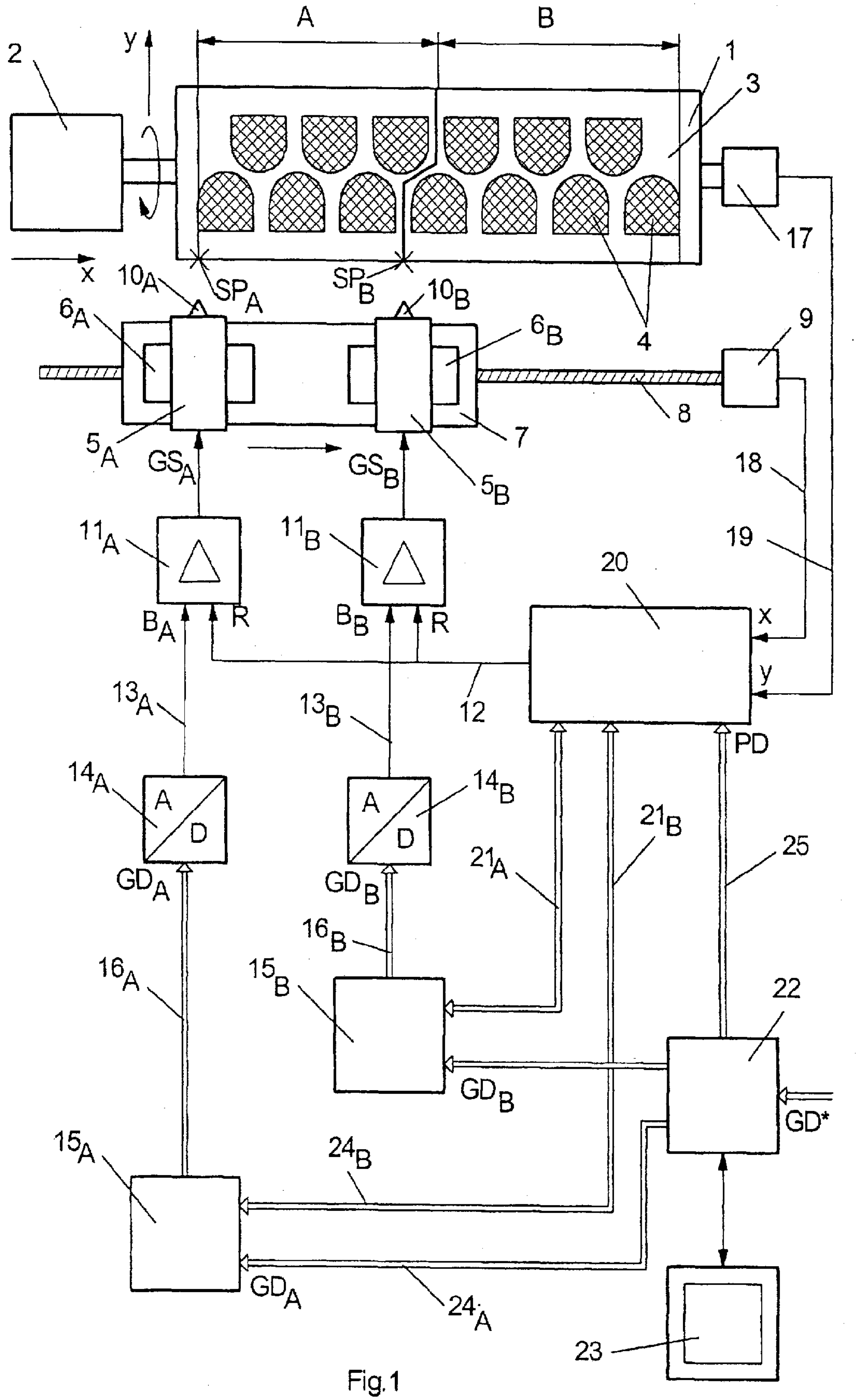
FIG. 1 is a principle block diagram of an engraving machine for printing cylinders.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention related are included.

The object is achieved according to the preferred embodiment in that at least one strip boundary between is automatically placed between engraving strips in at least one white space that remains unengraved between at least some of the elements to be printed, which strip boundary is placed by the engraving machine provided to engrave the respective printing cylinder or an electronic data processing device that is associated or can be associated with the engraving machine.

In DE 100 10 904 A1 it has basically already been proposed to also use white spaces presented for the packaging printing for a strip between the engraving regions of two engraving members, which there should occur manually in a complicated manner, however. Economically, this basic idea should primarily be implemented automatically via the present preferred embodiment in which the engraving machine or its workstation automatically positions not only the engraving members but also the establishment of the path of a strip boundary according to an automatic interrogation of the existing white spaces, and advantageously after an automatic check of the time savings that is thereby provided. The respective white space that is thereby to be considered should advantageously extend in a width of one engraving strip around the circumference of the printing cylinder; however, it is advantageously also possible to economically use white spaces distributed over the circumference and/or the length extent of the printing cylinder (possibly also of different width and/or length) according to the preferred embodiment for a more economic, time-saving engraving with optionally multiple engraving members. The engraving members can be of the same or different types, in particular can operate mechanically and/or with electromagnetic radiation.

According to the preferred embodiment, an automatic determination of the strip boundary is advantageously possible in that fast feed information is used that is stored for a faster crossing of a white space by an engraving member. Fast feed information is stored for wider white spaces in which the number of engraving tracks of the white space exceeds a predetermined number. This number is appropriately selected so that the time savings achieved by the fast feed justifies the necessary effort to establish a white space as a fast feed region and for the generation and storage of the fast feed information.

Nowadays, information about white spaces of a form to be engraved is normally already available to an engraving machine before the engraving. It has previously served on the one hand to control the automatic crossing of a white space with a speed higher than the engraving speed for the purpose of saving engraving time, and on the other hand to determine the engraving time to be expected.

Information about white spaces can be determined in different ways: in a pre-stage system during the generation of the engraving data, in a separate calculation run on a corresponding workstation or at the engraving machine itself. The engraving format is thereby explicitly communicated to the engraving machine via a manual input or via a digital job packet in what is known as a "job ticket". According to the preferred embodiment, the engraving machine then independently determines the ideal strip boundary between two engraving strips as well as the shape or the curve of these engraving strips from this aforementioned information.

Given an engraving machine that can be equipped with two engraving members, the strip boundary is advantageously placed in a white space located in the center of the engraving cylinder, for example when the number of engraving elements arranged in parallel on the printing cylinder and separated by white spaces or fast feed spaces is even and one of the white spaces is thereby located approximately in the axial center of the printing cylinder. Otherwise, the strip boundary is appropriately arranged as close as possible to the axial center of the printing cylinder so that approximately the same time is respectively required for the engraving of the engraving strips to be engraved by both engraving members.

Insofar as no suitable line boundary can be established or the engraving time savings to be expected would run below the preset value of a minimum engraving time savings, according to the preferred embodiment the printing cylinder is also advantageously engraved with only one engraving member. According to the preferred embodiment, the decision as to whether and, if necessary, where a strip boundary is established is thus advantageously made depending on the condition of what time savings actually results from the division into engraving lines and the use of multiple engraving members. This time savings is appropriately calculated by the engraving machine or the electronic data processing on the basis of the engraving data, the information about the white spaces or the fast feed information.

A strip boundary is advantageously ideal when the following three conditions are satisfied:

1. Strip boundary lies in a white space.
2. The strip boundary is positioned optimally close to the axial center of the engraving.
3. The absolute engraving time savings is greater than the value that was stored in an apparatus preset.

In the method according to the preferred embodiment, a cylinder layout can be designed by positioning the elements to be engraved on a monitor in a workstation with visual inspection, and the strip boundaries can appear in the design of the cylinder layout.

The engraving members are preferably positioned at axial engraving start points (predetermined by the line boundaries) before the engraving.

Protection is also independently claimed for a device for engraving of printing cylinders for packaging printing and similar printing applications in which an engraving member engraves elements to be printed into the printing cylinder in the form of cups and, for areal engraving, executes a feed movement parallel to the longitudinal axis of a printing cylinder (wherein, to shorten the engraving time when a print image or layout for a respective printing cylinder can be subdivided into at least two engraving strips situated parallel to one another in the axial direction, one engraving member can be associated with each engraving strip), which device is characterized in an independent solution of the posed object according to the preferred embodiment in that at least one strip boundary between engraving strips can be automatically established—by the engraving device provided to engrave the respective printing cylinder or an electronic data processing device associated with or that can be associated with the engraving device—in at least one white space remaining unengraved between elements to be printed.

The device according to the preferred embodiment is preferably characterized in that at least two engraving members are arranged on supports or carriages that can be moved independent from one another in the axial direction of a printing cylinder.

The engraving members or their supports or their carriages can thereby advantageously be moved with at least one linear actuator.

As already mentioned in the preceding, the engraving members can in particular possess engraving tools and/or laser engraving tools.

Figure 2:
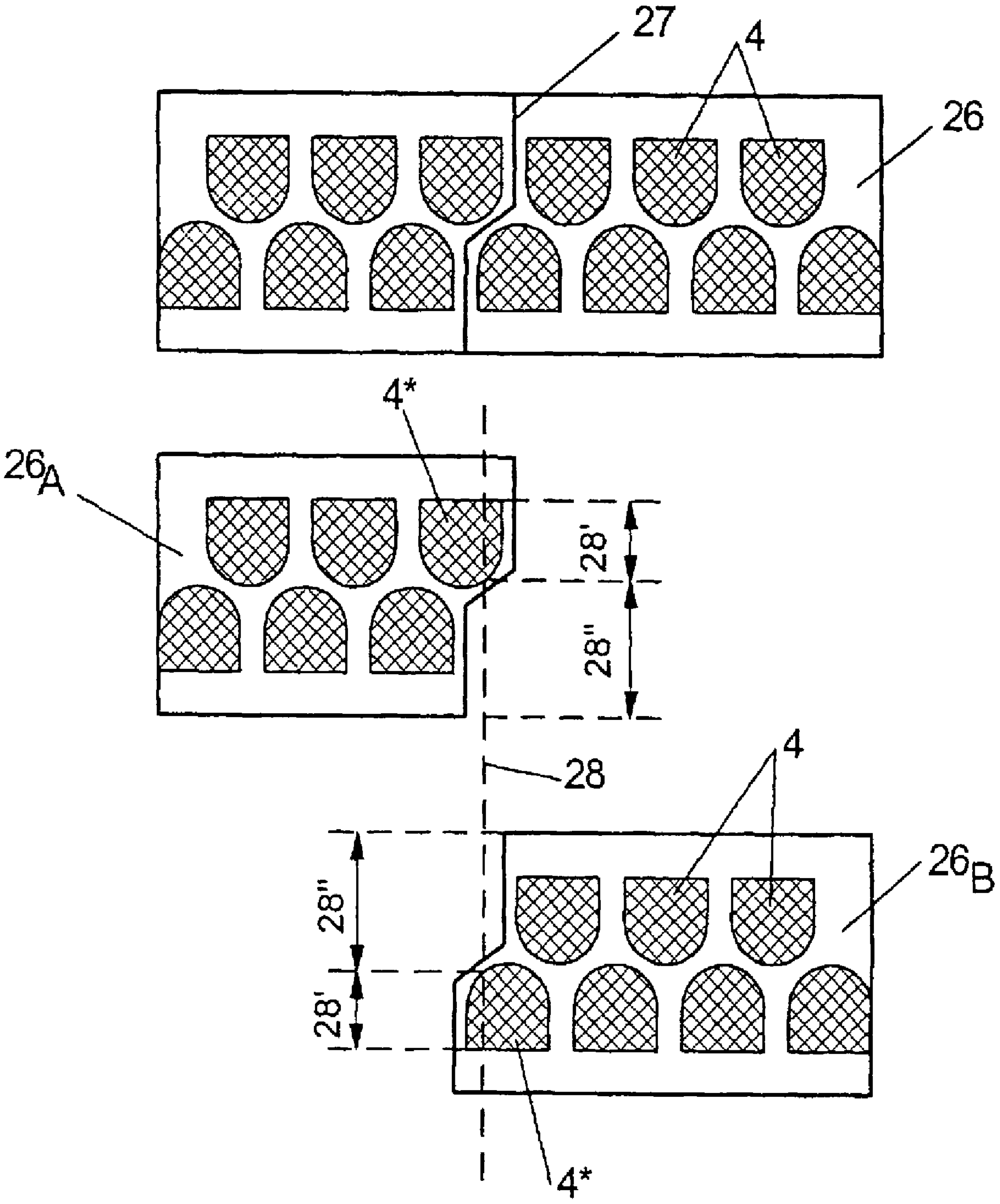
FIG. 2 is a cylinder layout with layout regions.
Figure 3:
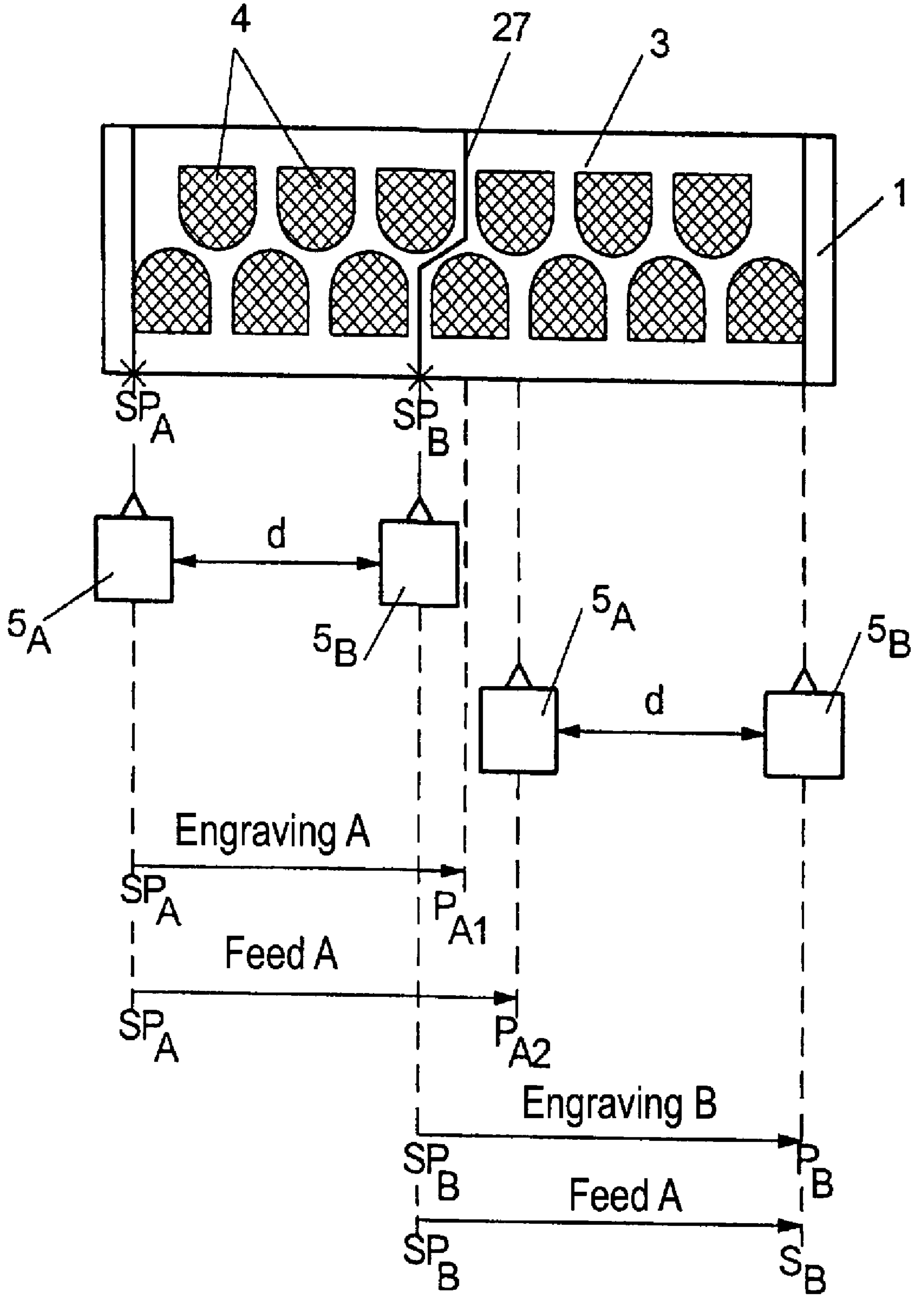
FIG. 3 is an example of an engraving workflow.

The preferred embodiment is subsequently explained in detail using FIG. 1 through 5, wherein FIGS. 1 through 3 are taken from DE 100 904 A1 (cited further above). The device according to the preferred embodiment can externally remain essentially unchanged relative to this known device; however the method to be implemented with this device, the more internal design and/or the setup of the device (in particular the programming or other preparation of a workstation) change according to the preferred embodiment.

FIG. 1 shows a principle block diagram of an engraving machine with a printing cylinder 1 that is driven in rotation by a cylinder actuator 2.

A printing form 3 for packaging printing or similar printing applications should be engraved on the printing cylinder 1. The printing form is comprised of a plurality of elements 4 (subsequently called engraving elements) to be engraved, the composition and position of which within the printing form are defined by a cylinder layout generated before the engraving.

To reduce the engraving time, it is proposed to subdivide the printing form 3 into multiple engraving strips (advantageously engraving strips running essentially in the circumferential direction)—in the exemplary embodiment into two circumferential engraving strips A, B—and to engrave each engraving strip A, B with a separate engraving member $\mathbf{5}_A$, $\mathbf{5}_B$. The subdivision of the printing form 3 into the circumferential engraving strips A,B thereby preferably occurs automatically or independently via the engraving machine itself, using the cylinder layout, such that the strip boundaries run between the engraving elements 4, and an (advantageously each) engraving element 4 of an engraving strip A, B is completely engraved by the engraving member $\mathbf{5}_A$, $\mathbf{5}_B$ of the corresponding engraving strip A, B in order to save engraving time on the one hand and, on the other hand, to avoid visible junctions in an engraving element 4 that are due to mechanical tolerances of the engraving members 5.

In the shown exemplary embodiment, the engraving members $\mathbf{5}_A$, $\mathbf{5}_B$ are mounted on individual engraving supports $\mathbf{6}_A$, $\mathbf{6}_B$ that can be shifted on an engraving carriage 7 in the axial direction of the printing cylinder 1 to axial engraving start points $SP_A$ and $SP_B$ and can be arrested there. The engraving carriage 7 can be moved axially along the printing cylinder 1 by means of a spindle 8 and an engraving carriage actuator 9; at least one linear actuator could advantageously be used instead of these. The engraving supports $\mathbf{6}_A$, $\mathbf{6}_B$ can be axially positioned on the engraving carriage 7 by means of manually operable fine actuators or by means of motorized actuators, which can likewise also occur more elegantly via a linear actuator or via the linear actuator according to the preferred embodiment.

Each engraving member $\mathbf{5}_A$, $\mathbf{5}_B$ cuts (with its engraving tool or laser tool $\mathbf{10}_A$, $\mathbf{10}_B$) cups or other printing elements arranged in an engraving grid in the manner of engraving strips into the generated surface of the rotating printing cylinder 1 while the respective engraving carriage 7 engraving members 5A, 5B moves axially along the printing cylinder 1.

For example, the engraving occurs in each strip on individual engraving lines running circularly in the circumferential direction around the printing cylinder 1, wherein after engraving one engraving line the engraving carriage 7 respectively executes an axial feed step to the next engraving line. For example, such an engraving method is described in U.S. Pat. No. 4,013,829. Alternatively, the engraving can also occur in a helical engraving line running around the printing cylinder 1. In this case, the engraving carriage moves continuously along the printing cylinder during the engraving.

The engraving tools $\mathbf{10}_A$, $\mathbf{10}_B$ of the engraving members $\mathbf{5}_A$, $\mathbf{5}_B$ are controlled by engraving control signals $GS_A$ and $GS_B$. The engraving control signals $GS_A$ and $GS_B$ are formed in engraving amplifiers $\mathbf{11}_A$, $\mathbf{11}_B$ from the superimposition of a periodic raster signal R on a conductor line 12 with image signal values $B_A$ and $B_B$ on lines $\mathbf{13}_A$, $\mathbf{13}_B$, which represents the tone values of the cups to be engraved between "light" (white) and "deep" (black). During the periodic raster signal R, a vibrating lifting motion of the engraving tool 10A, 10B for engraving produces the cups arranged in the engraving grid; the image signal values $B_A$ and $B_B$ corresponding to the tone values to be engraved determine the geometric dimensions of the cups to be engraved.

The analog image signals $B_A$ and $B_B$ are acquired in D/A converters $\mathbf{14}_A$, $\mathbf{14}_B$ from engraving data $GD_A$ and $GD_B$ of the printing form 3 to be engraved, which data are stored in engraving data memories $\mathbf{15}_A$, $\mathbf{15}_B$ and are read out from these engraving lines by engraving conductor line and are supplied to the D/A converters $\mathbf{14}_A$, $\mathbf{14}_B$ via data lines $\mathbf{16}_A$, $\mathbf{16}_B$. An engraving datum of at least one byte—which, among other things, contains the tone value (between "light" (GD=161) and "deep" (GD=1)) to be engraved—is thereby associated with each engraving location for a cup in the engraving grid.

The engraving locations in the engraving grid are defined by spatial coordinates (x, y) of an XY coordinate system associated with the printing cylinder 1, the Y-axis of which is oriented in the circumferential direction of the printing cylinder 1 (engraving direction) and the X-axis of which is oriented in the axial direction of the printing cylinder 1 (feed direction). A position transmitter 17 mechanically coupled with the printing cylinder 1 generates the y spatial coordinates and the engraving carriage actuator 9 generates the corresponding x spatial coordinates of the engraving locations on the printing cylinder 1. The spatial coordinates (x, y) are supplied via conductors 18, 19 to an engraving control group 20 that controls the engraving workflows.

From the spatial coordinates (x, y), the engraving control group 20 generates read addresses and corresponding read clock sequences that are supplied via data lines $\mathbf{21}_A$, $\mathbf{21}_B$ to the engraving data memories $\mathbf{15}_A$, $\mathbf{15}_B$. Moreover, in the engraving control group 20 the raster signal R is acquired on line 12 and diverse control signals are acquired to control the cylinder actuator 2 and the engraving carriage actuator 9.

The cylinder layout of the printing form 3 to be engraved is designed, for example by an operator offline in workstation 22 via manual positioning of the engraving elements 4 by means of a cursor or via input of position coordinates under visual inspection on an observation monitor 23, and is stored per pixel in the form of layout data in the workstation 22.

During or after the design of the cylinder layout, according to the preferred embodiment strip boundaries (in the exemplary embodiment one line boundary) in the cylinder layout running between at least some of the engraving elements 4 are also automatically established by the workstation 22 (see also FIGS. 5 and 6 for this) which subdivide the printing form 3 to be engraved into engraving strips (A, B) and the cylinder layout into associated layout regions.

The dimensions of the printing cylinder 1, the possible axial feed paths of the engraving members $\mathbf{5}_A$, $\mathbf{5}_B$ or the possible axial feed path of the engraving carriage 7, and possibly also the separation of the engraving members $\mathbf{5}_A$, $\mathbf{5}_B$ or engraving carriage 7 from one another are taken into account in the establishment of the strip boundaries. The established strip boundaries are correspondingly marked in the layout data.

Before or after determining the strip boundaries, the engraving data $GD_A$ and $GD_B$ required for engraving of the individual engraving strips (A, B) are assembled in the workstation 22 engraving line by engraving line from the engraving data (GD*) of the individual engraving elements 4 using the layout regions defined in the cylinder layout. For example, the engraving data (GD*) of the engraving elements 4 are acquired by scanning models or patterns with a scanner and/or by mounting the individual models in an image processing system.

In the generation of the engraving data GD of an engraving line, the engraving data GD of engraving elements 4 are associated with those engraving line segments that belong to the engraving elements 4 while the tone value "super white" representing engraving data (GD>161) is associated with "blank" engraving line segments W (FIG. 5), for example, wherein an engraving tool $\mathbf{10}_A$, $\mathbf{10}_B$ does not contact the generated surface of the printing cylinder 1 given the engraving of a "super white" tone value and thus does not engrave a cup. As an alternative to the engraving of "super white" at "blank" engraving line segments, the engraving members $\mathbf{5}_A$, $\mathbf{5}_B$ or the engraving tools $\mathbf{10}_A$, $\mathbf{10}_B$ are also lifted from the generated surface of the printing cylinder 1 by suitable control signals.

The engraving data $GD_A$ and $GD_B$ generated by in the workstation 22 are transferred via data lines $\mathbf{24}_A$, $\mathbf{24}_B$ into the corresponding engraving data memories $\mathbf{15}_A$, $\mathbf{15}_B$. Upon transfer of the engraving data $GD_A$ and $GD_B$, position data PD (for example the x location coordinates of the engraving start points $SP_A$ and $SP_B$ in the engraving strips A, B) are simultaneously transmitted via a data line 25 to the control group 20 and are stored there.

For clarification, FIG. 2 shows a cylinder layout 26 that is subdivided by a strip boundary 27 into two layout regions $\mathbf{26}_A$, $\mathbf{26}_B$. Moreover, an engraving line 28 is shown that is composed of an engraving line segment 28' belonging to the engraving elements 4* and "blank" engraving line segments 28".

An example of an engraving workflow is subsequently explained in detail using FIG. 3.

FIG. 3 shows an example of an engraving workflow. The printing cylinder 1 is shown with the printing form 3 to be engraved, which is comprised of the engraving elements 4 and the two engraving strips A, B that are separated from one another by the strip boundary 27.

First, the engraving members $5_A$, $5_B$ are positioned at the engraving start points $SP_A$ and $SP_B$ of the engraving strips A, B. In the shown exemplary embodiment, the positioning occurs via axial displacement of the engraving supports $6_A$, $6_B$ on the or with the engraving carriages 7. The positioning of the engraving members $5_A$, $5_B$ at the engraving start points SP can occur automatically using the position data PD expressed in the workstation 22, controlled by the engraving control group 20.

After the positioning of the engraving members $5_A$, $5_B$, the engraving of the engraving strips A, B is implemented. The engraving members $5_A$, $5_B$ with the fixed separation d from one another are moved along the printing cylinder 1 in the X direction, from the start position. The first engraving member $5_A$ engraves the first engraving strip A from the engraving start point $SP_A$ up to the point $P_{A1}$. The second engraving member $5_B$ engraves the second engraving strip B from the engraving start point $SP_B$ up to the point $P_B$ and thereby moves from the engraving start point $SP_B$ to the point $P_B$ while the first engraving member $5_A$ moves at a fixed distance d of the engraving members $5_A$, $5_B$ from one another from the engraving start point $SP_A$ up to the point $P_{A2}$. Via (preferably separate) feed actuators and/or controllers for the engraving members $5_A$, $5_B$, it can be ensured in a simple manner that the engraving members economically move independent of one another; if necessary, they (perhaps intermittently) also take up a park position, and the feed movements of the engraving members $5_A$, $5_B$ end with the engraving.

In the described exemplary embodiments, the printing form was engraved directly onto the printing cylinder. It also lies within the scope of the preferred embodiment to engrave the printing form on printing plates that are clamped to a printing cylinder.

Figure 4:
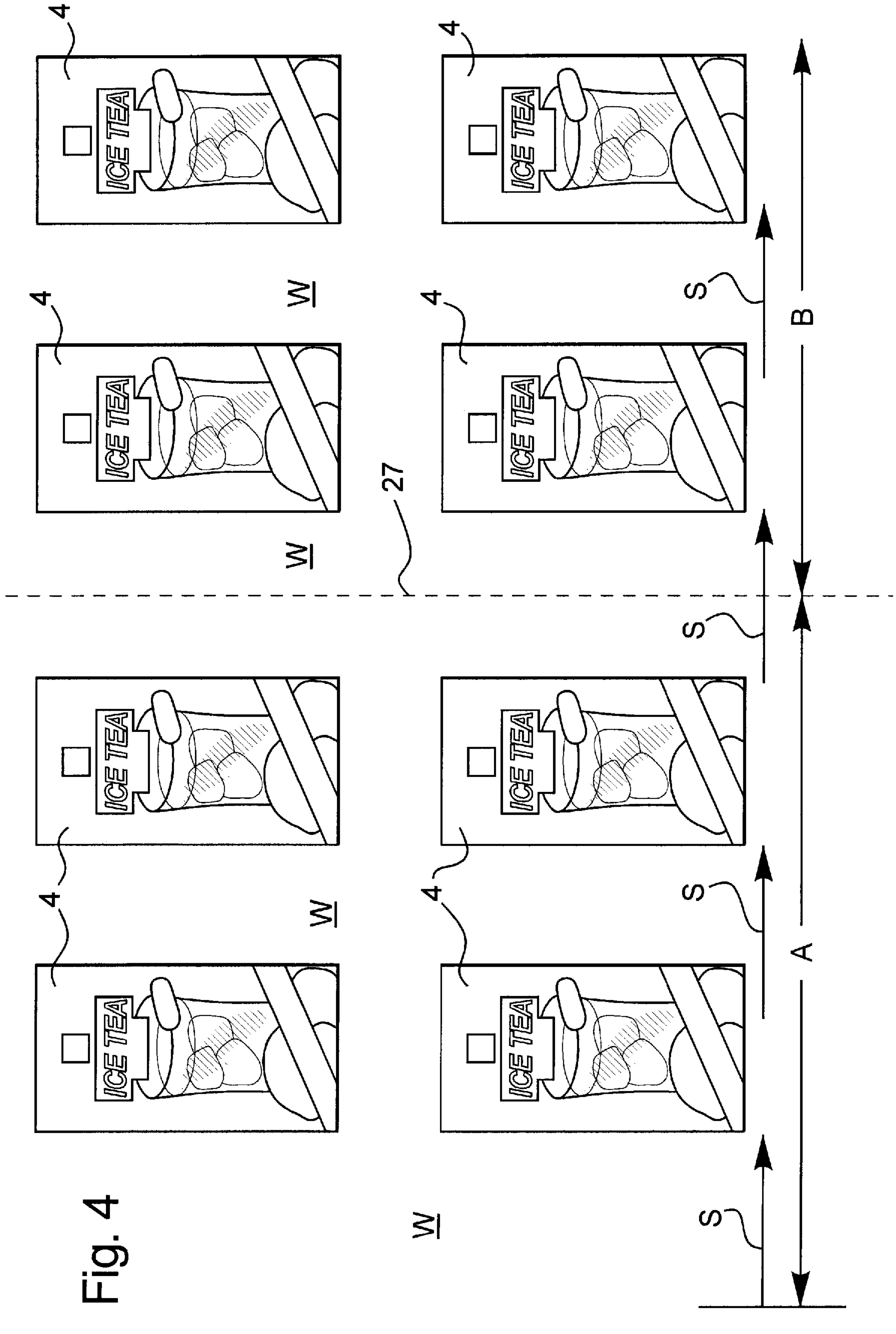
FIG. 4 is a cylinder layout for a packaging printing, provided with a strip boundary according to the preferred embodiment.

FIG. 4 shows a second example of a cylinder layout for packaging printing. Packaging front sides are provided as elements 4. A strip boundary 24 between lines A and B has been placed in a white space W between elements 4. The strip boundary 24 has been positioned in the axial center of the cylinder layout, such that approximately the same amount of time is required by each engraving member $5_A$, $5_B$ to engrave both engraving strips A and B on both sides of the strip boundary 24 by means of both engraving members $5_A$, $5_B$. With arrows S it has been indicated that corresponding fast feed information S has been stored in the engraving machine for the white spaces W in order to quickly cross the white spaces W.

Figure 5:
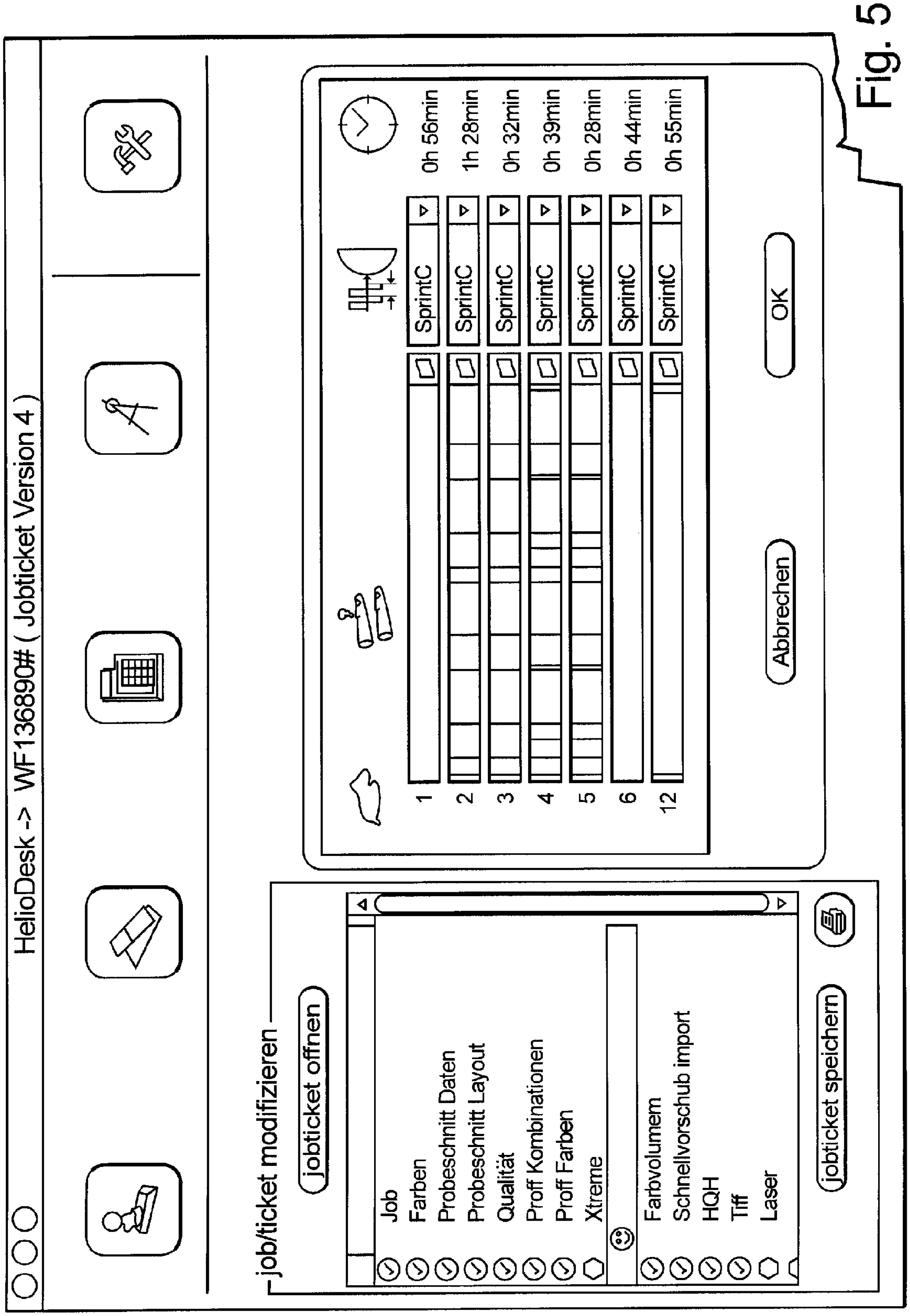
FIG. 5 is a monitor image of the optimization of the engraving time according to the preferred embodiment.

FIG. 5 shows by way of example a monitor image of the optimization of the engraving time according to the preferred embodiment on a monitor 23. In particular, the respective engraving times for the elements 4 that result given use of a single engraving member or given use of two engraving members $5_A$, $5_B$ depending on the positioning of the strip boundary 24 are recognizable in lines 2 through 5 on the monitor image. As is apparent, the time differences are significant, and therefore also the possible time savings. In FIG. 5 the white spaces are represented as regions with grey background while the engraving elements are shown light.

While preferred embodiments have been illustrated and described in detail in the drawings and foregoing description, the same are to be considered as illustrative and not restrictive in character, it being understood that only two preferred embodiments have been shown and described and that all changes and modifications that come within the spirit of the invention both now or in the future are desired to be protected.

We claim as our invention:

1. A method for engraving a printing cylinder for packaging, pattern, or wallpaper printing with an electronic engraving machine equipped with at least two engraving members, comprising the steps of:

engraving with each engraving member elements to be printed into the printing cylinder and, for areal engraving, executing a feed movement parallel to a longitudinal axis of the printing cylinder;

to shorten an engraving time, subdividing a print image or a layout for the printing cylinder into at least two circumferential engraving strips situated in parallel next to one another in an axial direction and with one engraving member being associated with each engraving strip; and automatically placing at least one strip boundary by the engraving machine or by an electronic data processing device associated with said engraving machine between said engraving strips in at least one white space remaining unengraved between at least some of the elements to be printed.

2. A method according to claim 1 wherein the white space extends at least in one width of the engraving strip around a circumference of the printing cylinder.

3. A method according to claim 1 wherein a fast feed information that is stored for a faster crossing of the white space by an engraving member is used to establish the strip boundary.

4. A method according to claim 3 wherein the stored fast feed information provides a faster crossing of a white space only when the white space has a predetermined minimum width.

5. A method according to claim 1 wherein engraving data are stored in a job ticket.

6. A method according to claim 1 wherein the layout is designed via positioning of the elements to be engraved in a workstation under visual inspection on a monitor, and the strip boundaries appear in a design of the cylinder layout.

7. A method according to claim 1 wherein the engraving members are positioned at axial engraving start points predetermined by the strip boundaries before the engraving.

8. An electronic engraving machine for engraving a printing cylinder for packaging, pattern, or wallpaper printing, comprising:

at least two engraving members and an electronic data processing device;

the engraving members being able to engrave elements to be printed into the printing cylinder and, for areal engraving, executing a feed movement parallel to a longitudinal axis of the printing cylinder;

a print image or layout for the printing cylinder being subdivided into at least two circumferential engraving strips situated in parallel and next to one another in an axial direction in order to shorten engraving time, and one engraving member being associated with each engraving strip; and the engraving machine or said electronic data processing device automatically placing at least one strip boundary between the engraving strips and at least one white space remaining unengraved between at least some of the elements to be printed.

9. A machine according to claim 8 wherein the at least two engraving members are arranged on supports or carriages that are moved independent of one another in the axial direction of the printing cylinder.

10. A machine according to claim 8 wherein the engraving members, or supports or carriages therefore, are moved with at least one line actuator.

11. A machine according to claim 8 wherein the engraving members have engraving tools or laser engraving tools.

12. A machine according to claim 8 wherein the engraving machine or the electronic data processing device uses fast feed information stored for a faster crossing of the white space by the engraving member to establish the strip boundary.

13. A machine according to claim 8 wherein the engraving machine or the electronic data processing device calculates a time savings that a division into engraving strips and a use of multiple engraving members actually yields.

14. A machine according to claim 13 wherein the engraving machine or the electronic data processing device establishes the strip boundary when the calculated time savings exceeds a predetermined time duration.

15. A method for engraving a printing cylinder for packaging, pattern, or wallpaper printing with an electronic engraving machine equipped with at least two engraving members, comprising the steps of:

engraving with each engraving member elements to be printed into the printing cylinder, and executing a feed movement parallel to a longitudinal axis of the printing cylinder;

to shorten an engraving time, subdividing a print image or a layout for the printing cylinder into at least two circumferential engraving strips and with one engraving member being associated with each engraving strip; and automatically placing at least one strip boundary by the engraving machine or by an electronic data processing device associated with said engraving machine between the engraving strips in at least one white space remaining unengraved between at least some of the elements to be printed.

16. A method for engraving a printing cylinder for packaging, pattern, or wallpaper printing with an electronic engraving machine equipped with at least two engraving members, comprising the steps of:

deciding whether engraving with said least two engraving members a print image or a layout for the printing cylinder subdivided into at least two circumferential engraving strips will result in a time savings which is sufficient, and if a decision is made to proceed with the engraving utilizing the at least two engraving members and the subdivided circumferential engraving strips, then performing the steps of engraving with each engraving member elements to be printed into the printing cylinder and, for areal engraving, executing a feed movement parallel to a longitudinal axis of the printing cylinder, to shorten the engraving time, subdividing the print image or the layout for the printing cylinder into said at least two circumferential engraving strips situated in parallel next to one another in an axial direction and with one engraving member being associated with each engraving strip, and automatically placing at least one strip boundary by the engraving machine or by an electronic data processing device associated with said engraving machine between said engraving strips in at least one white space remaining unengraved between at least some of the elements to be printed.

17. A method according to claim 16 wherein the time savings is calculated in that a time required for an engraving of the printing cylinder with a single engraving member is compared with a time required for an engraving of the parallel engraving strips with multiple engraving members.

18. A method according to claim 17 wherein the strip boundary is placed in the white space in or near an axial center of the printing cylinder in order to subdivide the print image or layout into the two engraving strips situated parallel to one another and next to one another in the axial direction, and wherein a time required for an engraving of the printing cylinder with a single engraving member is compared with a time required for an engraving of the two parallel engraving strips with multiple engraving members.

* * * * *